March 3, 1970 — W. M. O'TOOLE — 3,498,210
PORTABLE BARBECUE GRILL
Filed June 3, 1968
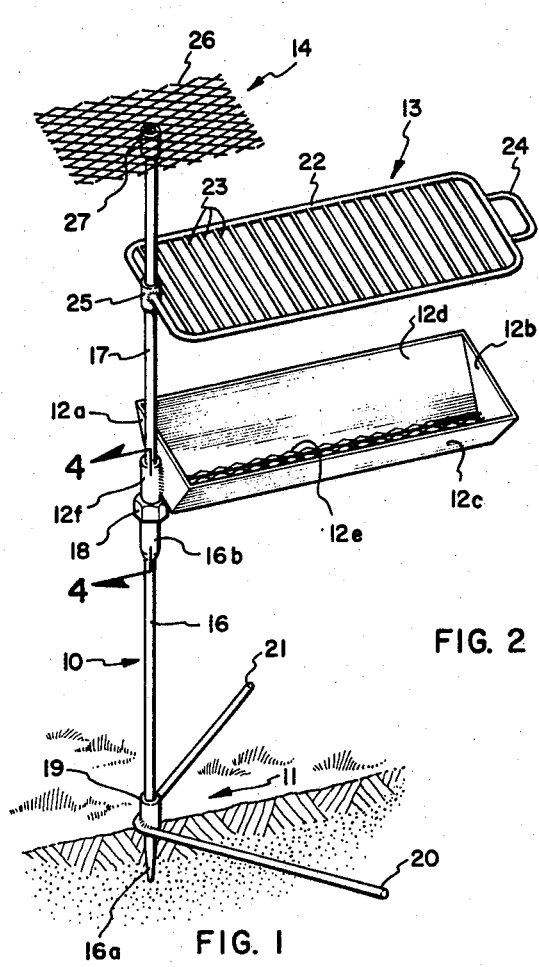
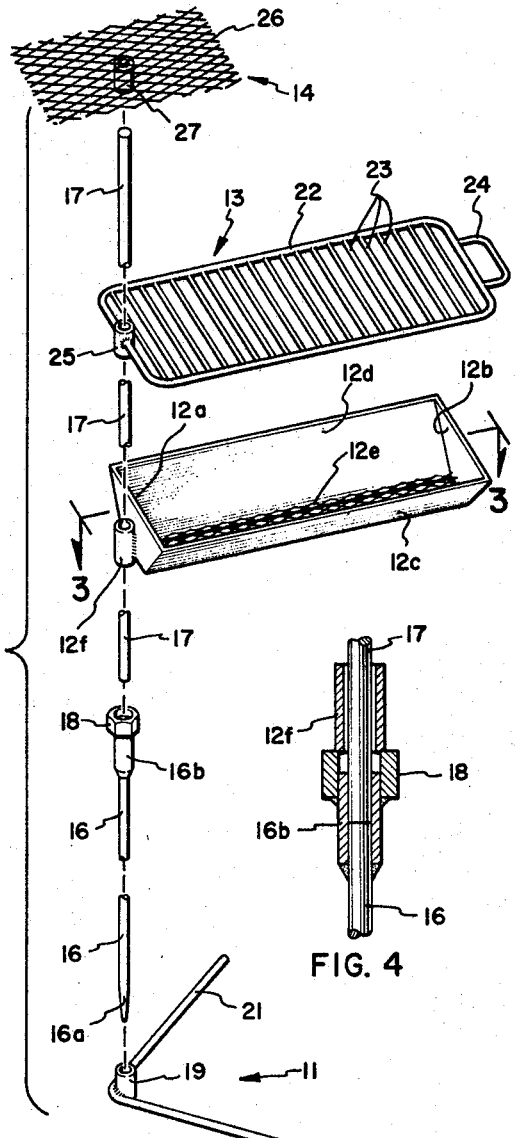
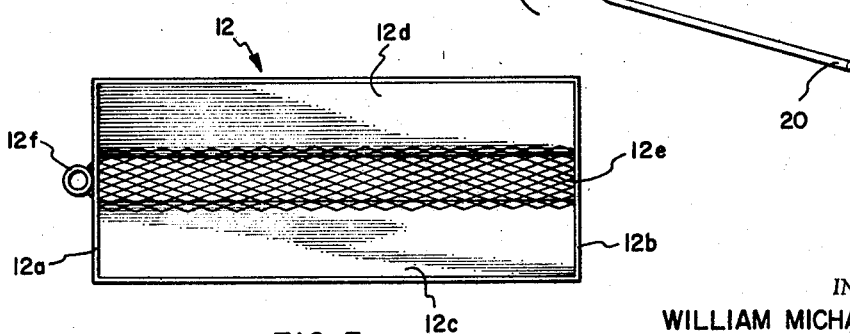
INVENTOR:
WILLIAM MICHAEL O'TOOLE
BY:
ATTORNEY

United States Patent Office 3,498,210
Patented Mar. 3, 1970

3,498,210
PORTABLE BARBECUE GRILL
William Michael O'Toole, 1980 South 150 West, Bountiful, Utah 84010
Filed June 3, 1968, Ser. No. 733,980
Int. Cl. A47j 37/07
U.S. Cl. 99—357      2 Claims

ABSTRACT OF THE DISCLOSURE

A compact, easily assembled barbecue grill having a firebox, grate-type grill, and shelf, all adapted to be cantilevered from or supported on a sectional stake that is adapted to be driven into the ground at a desired location. The stake is passed through a sleeve portion of a spread base that rests on the ground into which the stake is inserted to thereby stabilize the grill.

BRIEF DESCRIPTION

In the past, there have been developed a great many portable grills suitable for barbecuing foods, and many of these can be easily disassembled for storage purposes.

However, so far as I am aware, there has not heretofore been available a portable barbecue grill that will stand a convenient height above the ground, provide a cooking surface that can be pivoted away from the firebox and that can be moved up and down with respect to the firebox to thereby control heat application, and that has a removable shelf for condiment storage or as a working area, and that can be easily disassembled, without tools, for compact storage or travel.

Principal objects of the present invention are to provide a barbecue grill that is easily disassembled and that can be compactly stored, and that can be set up to have a firebox at a convenient working height, with the cooking surface being adjustable, so that the cooking temperature can be controlled and movable away from the firebox during food preparation and removal and with a shelf that can be used to store condiments or as a working surface.

Another object is to provide such a barbecue grill wherein a minimum of stand or leg material, that must be stored, is used.

To achieve these objects, I have provided, as principal features of the invention, a stand that is made up of a stake formed of coupled rod sections, the lowermost of which is adapted to be driven into the ground, and a spread base that prevents excess tipping of the stake, through which the lowermost rod section is driven.

An elongate firebox having a lattice base through which air can be admitted has a sleeve at one end adapted to fit over an upper stake section and to be cantilevered out from the stake.

A grill, made up of a peripheral frame substantially corresponding to the shape of the open top of the firebox, has crossbars on which food to be cooked can be placed and a sleeve at one end adapted to fit over an upper stake section such that the grill is cantilevered out from the stake at a position just above the firebox.

At least one shelf is desirably provided. The shelf can be made solid or of latticework and can sit on top of the stake or, like the firebox and grill can be cantilevered therefrom.

Additional objects and features will become apparent from the following detailed description and drawing disclosing what is presently contemplated as being the best mode of the invention.

THE DRAWING

FIG. 1, is a perspective, assembled view of the grill of the invention;

FIG. 2, an exploded perspective view;

FIG. 3, a top plan view of the firebox; and

FIG. 4, a vertical section, taken on the line 4—4 of FIG. 2.

DETAILED DESCRIPTION

The grill of the invention comprises a support post 10, a spread base 11, a firebox 12, a grate-type grill 13 and a support shelf 14.

The support post 10, includes a lower rod section 16, sharpened at its lower end 16a and provided with a flared tubular section 16b at the other end. Tubular section 16b is adapted to snugly receive the lower end of an upper rod section 17, and a collar 18 is fixed to and surrounds the tubular section 16b to provide a pounding surface for the lower rod section.

In use, the sharpened end of the lower rod section is inserted downwardly through a collar 19 of the spread base 11 and is forced into the ground. If necessary, a sledge, or other tool, can be used to drive it into the ground by pounding on the collar 18 and, since the collar is fixed to outside of flared tubular section 16b, such pounding, even if it deforms collar 18 somewhat will not affect the admission of the lower end of the upper rod section into the flared tubular section 16b.

The firebox 12, includes end walls 12a and 12b, side walls 12c and 12d that are sloped inwardly from an open top to a bottom grate 12e and a collar 12f, fixed to the end wall 12a.

Collar 12f is adapted to slide freely, but closely over the upper rod section until it rests above the flared tubular section 16b of the lower rod section on the collar 18. The firebox is then cantilevered outwardly from the rod sections, above and between the legs 20 and 21 of the spread base 11.

The weight of the cantilevered firebox tends to tip the rod sections, in the direction of the legs, which then brace the rod sections against their tipping further than the distance allowed by the play between collar 19 and lower rod section 16, and the anchoring of the sharpened end 16b of the lower rod section in the ground.

Grate-type grill 13 is made up of an outer frame 22 and crossbars 23. A handle 24 is preferably provided at one end of the frame 22 to facilitate positioning of the grill and a similar handle (not shown) can be provided at the other end, if desired. A collar 25, adapted to fit loosely but closely over the upper rod section 17, is provided at the other end thereof.

In use, the grill is positioned after the rod sections and base have been assembled and put in a standing position and the firebox has been put in place. The grill is then cantilevered out from the upper rod section and because of the torque applied to the collar 25 it binds against the rod section to hold the grill in any set position above the firebox. As food to be cooked is placed on the grill the cantilevered weight thereof increases, thereby increasing the binding of collar 25 on rod 17 and more positively insuring that the grill will remain at its set level. To adjust the position of the grill it is only necessary to lift its cantilevered end, as by lifting on handle 24, and to align the collar 25 with the rod section so that no binding occurs. The collar 25 can then be slid along the rod section until the desired grill position is attained. The grill can be pivoted away from the firebox without first lifting the cantilevered end, so it becomes a simple matter to move it away from fuel in the firebox.

Support shelf 14 is shown as having a platform 26 constructed of mesh material, but it should be apparent that the platform could as well be made solid. A sleeve 27 is fixed to and depends from the platform 26 to telescope downwardly over the upper end of the upper rod section 17. While sleeve 27 is illustrated as depending from the approximate center of platform 26, it could be offset therefrom and, like the grill, the shelf could be arranged to be cantilevered out from the rod sections, also, if desired, more than one such cantilevered shelf can be used and one or more cantilevered shelves can be used in conjunction with a shelf, such as is shown, that sits on top of the upper rod section.

I claim:
1. A portable barbecue grill comprising:
   a stake formed of a lower section having a tubular upper end and a pointed lower end and an upper section telescopingly fitted into the tubular upper end of the lower section and a pounding collar surrounding the tubular upper end and extending thereabove;
   a firebox having a sleeve at one end adapted to slide on the upper section of the stake and to rest on the pounding collar, a mesh bottom, side walls diverging outwardly from the mesh bottom and end walls;
   a grill above the firebox, said grill having a sleeve at one end thereof adapted to freely slide but fit closely on the upper section of the stake and a handle at the other end thereof projecting beyond the firebox when the grill is above the firebox; and
   a shelf having a tubular section with its upper end closed, depending therefrom and adapted to telescope down over the top of the upper section of the stake.
2. A portable barbecue grill as in claim 1, further including
   a base having a cylindrical collar through which the lower section of the stake is slidably inserted; and
   a pair of spread legs fixed to and projecting radially outward from the collar, each of said legs comprising a straight rod adapted to engage the ground surface for substantially its entire length.

References Cited

UNITED STATES PATENTS

| | | |
|---|---|---|
| 1,423,612 | 7/1922 | Jewett. |
| 1,666,293 | 4/1928 | Lorton. |
| 2,173,024 | 9/1939 | Park. |
| 2,522,223 | 9/1950 | Hardin et al. |
| 2,597,157 | 5/1952 | Martino. |
| 2,827,846 | 3/1958 | Karkling. |
| 2,844,139 | 7/1958 | Lucas. |
| 2,977,953 | 4/1961 | Dowdy _____ 126—30 |
| 3,094,113 | 6/1963 | Avila _____ 126—9 |
| 3,162,113 | 12/1964 | Tallaksen _____ 99—450 XR |
| 3,395,692 | 8/1968 | Johns _____ 126—30 |

WALTER A. SCHEEL, Primary Examiner

A. O. HENDERSON, Assistant Examiner

U.S. Cl. X.R.

99—443, 450; 126—9